United States Patent
Sun et al.

(10) Patent No.: US 10,148,089 B2
(45) Date of Patent: Dec. 4, 2018

(54) AUTOMATIC POWER GENERATION CONTROL IN MICRO-GRIDS

(71) Applicant: Mitsubishi Electric Research Laboratories, Inc., Cambridge, MA (US)

(72) Inventors: Hongbo Sun, Lexington, MA (US); Zhao Wang, Mishawaka, IN (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 585 days.

(21) Appl. No.: 14/853,252

(22) Filed: Sep. 14, 2015

(65) Prior Publication Data
US 2017/0077700 A1    Mar. 16, 2017

(51) Int. Cl.
*H02J 3/00* (2006.01)
*G05B 17/02* (2006.01)

(52) U.S. Cl.
CPC ............... *H02J 3/00* (2013.01); *G05B 17/02* (2013.01)

(58) Field of Classification Search
CPC ................................. H02J 3/00; G05B 17/02
USPC ........................................................ 700/287
See application file for complete search history.

(56) References Cited

U.S. PATENT DOCUMENTS

| | | | |
|---|---|---|---|
| 6,819,087 B2 | 11/2004 | Delmerico et al. | |
| 8,498,752 B2 | 7/2013 | Wells | |
| 8,710,815 B2 | 4/2014 | Feng et al. | |
| 2011/0316518 A1 | 12/2011 | Feng et al. | |
| 2014/0100705 A1 | 4/2014 | Shi et al. | |
| 2015/0012144 A1* | 1/2015 | Wang | H02J 3/00 700/291 |
| 2015/0311716 A1* | 10/2015 | He | H02J 3/16 700/287 |
| 2015/0337808 A1* | 11/2015 | Kang | F03D 7/048 290/44 |

OTHER PUBLICATIONS

On finite gain Lp stability of nonlinear sampled-data systems. Article. [Online]. Luca Zaccarian, [retrieved on Mar. 22, 2018]. Retrieved from Internet: <URL: https://www.sciencedirect.com/science/article/pii/S0167691102003249> (Year: 2002).*

* cited by examiner

*Primary Examiner* — Robert E Fennema
*Assistant Examiner* — Marzia T Monty
(74) *Attorney, Agent, or Firm* — Gene Vinokur; James McAleenan; Hironori Tsukamoto (57) ABSTRACT

A method controls a micro-grid connected to a power distribution system. The method determines parameters of a model of dynamics of the micro-grid using measurements of power flow at a point of common coupling (PCC) of the micro-grid with the power distribution system. The model is exponentially stable on a voltage set-point at the PCC and the method determines, using the parameters of the model, an amount of reactive power required to maintain the voltage at the PCC asymptotically stable on the voltage set-point. Next, the method controls a generator of the micro-grid to produce the amount of reactive power.

12 Claims, 6 Drawing Sheets

United States Patent

AUTOMATIC POWER GENERATION CONTROL IN MICRO-GRIDS

FIELD OF THE INVENTION

The present invention relates generally to electric power systems, and more particularly to controlling a micro-grid connected to a power distribution system.

BACKGROUND OF THE INVENTION

A micro-grid is a localized grouping of power generation, storage, and loads that can be connected to the power distribution system (PDS) to provide an additional control layer integrating intermittent renewable energy resources to the power distribution system. From the point of view of a PDS, a connected micro-grid can be controlled as if it is one entity.

A PDS usually treats the micro-grid as a positive or negative load due to unstable voltage on the micro-grid caused by load or generation variations. Such instability reduces the quality of power supply to the PDS, and requires the PDS to control the variations of the voltage supplied by the micro-grid. However, maintaining the stable voltage supply to the PDS requires sophisticated measurements of the power flow on the entire PDS and the micro-grid, which complicates plugin capability of the micro-grid into the PDS.

For example, some PDSs control the micro-grids by adding compensation signal to voltage regulator and/or emulating a voltage source that requires complex power flow computations. For example, voltage regulation methods described in U.S. Pat. No. 8,710,815 and US 20110316518 regulate output voltage dynamic response by adding compensation to a fast inverter's feedback signal. Controlling the micro-grid with the feedback signal determined by PDS provides an extra burden for the PDS and reduces plug-and-play capabilities of the micro-grids.

In addition, providing voltage-control ancillary service by maintaining power quality is a challenging task for micro-grids, because these small-scale power systems are typically managed by droop controllers. Droop controllers help a micro-grid to maintain power sharing when system states deviate from their nominal values. System state changes make PDS operators unable to predict power quality in a power distribution network with micro-grids.

Accordingly, there is a need for a system and a method for local control of the voltage by the micro-grid resulting in substantially constant voltage supply to the PDS to enable plug and play capability of the micro-grids.

SUMMARY OF THE INVENTION

It is an object of some embodiments of the invention to provide a system and a method for controlling the generator of the micro-grid resulting in substantially constant voltage on a point of common coupling (PCC) of the micro-grid to the power distribution system (PDS). It is another object of some embodiments to provide such a method that controls the generator using local information available to the controller of the micro-grid. Such information can include results of power flow analysis based on the measurements on the micro-grid and/or a link connecting the PCC with the bus of PDS. Such a local control enables plug-and-play capability of the micro-grid connected to the PDS that allows connecting a micro-grid to the PDS without modification of the operation of the PDS beyond the connection link.

Some embodiments of the invention are based on a realization that such a voltage can be determined and/or regulated according to a model of dynamics of the micro-grid exponentially stable on a voltage set-point at the PCC. It was further realized that such a model can be determined, e.g., using a function of a reactive power injected into the PCC, a function of load variation in the micro-grid, and a function of voltage variation at the PCC. In such a manner, the parameters of such a model can be determined using measurement of the power flow on a link connecting the PCC with the PDS, which is local information available to the controller of the micro-grid.

For example, in one embodiment, the model includes a combination of a primary droop control determining the reactive power proportional to the voltage on the PCC and a secondary stabilization control component shifting the droop slope of the primary droop controller to ensure the exponential stability. This embodiment allows one to upgrade droop controllers widely used in the micro-grids. This secondary stabilization controller uses local information to determine a control input to the primary droop controller. The additional control enables maintaining a constant voltage at the PCC regardless of load or state changes in the rest of power system. Even when there is a constantly changing local load connected to the PCC, the secondary voltage controller is able to cancel impact of the load variation on voltage magnitude. With such a voltage regulation capability, a micro-grid can be used to improve power quality in a power distribution network hence provide voltage-regulation ancillary service.

The secondary stabilization controller guaranties exponential stability with respect to a set point without the need to modify control command from a distribution system operator. When measurements come with the disturbances, such as measurement noise, input-output finite-gain stability can also be ensured. Also, the secondary stabilization controller is compatible with existing voltage control devices. Because voltage of the PCC is regulated at a set point, operation cost is reduced by decreasing usage of existing voltage control devices in a power distribution network.

Accordingly, one embodiment of the invention discloses a method for controlling a micro-grid connected to a power distribution system. The method includes determining parameters of a model of dynamics of the micro-grid using measurements of power flow at a point of common coupling (PCC) of the micro-grid with the power distribution system, wherein the model is exponentially stable on a voltage set-point at the PCC; determining, using the parameters of the model, an amount of reactive power required to maintain the voltage at the PCC asymptotically stable on the voltage set-point; and controlling a generator of the micro-grid to produce the amount of reactive power. At least some steps of the method are performed using a processor.

Another embodiment discloses a system for controlling the voltage of a micro-grid connected to a power distribution system including a generator producing a requested amount of reactive power; a processor determining an amount of reactive power using a model of dynamics of the micro-grid exponentially stable on a voltage setpoint at a point of common coupling (PCC) of the micro-grid and the power distribution network, wherein the model includes a function of a reactive power injected into the PCC, a function of load variation in the micro-grid, and a function of voltage variation at the PCC; a set of sensors for measuring state of power flow on a link connecting the PCC with a bus of the power distribution system to determine parameters of the model;

and a reactive-power controller controlling the generator to produce the amount of reactive power.

DETAILED DESCRIPTION OF PREFERRED EMBODIMENT

Overview of Micro-Grid Connected to Power Distribution System

Figure 1A:
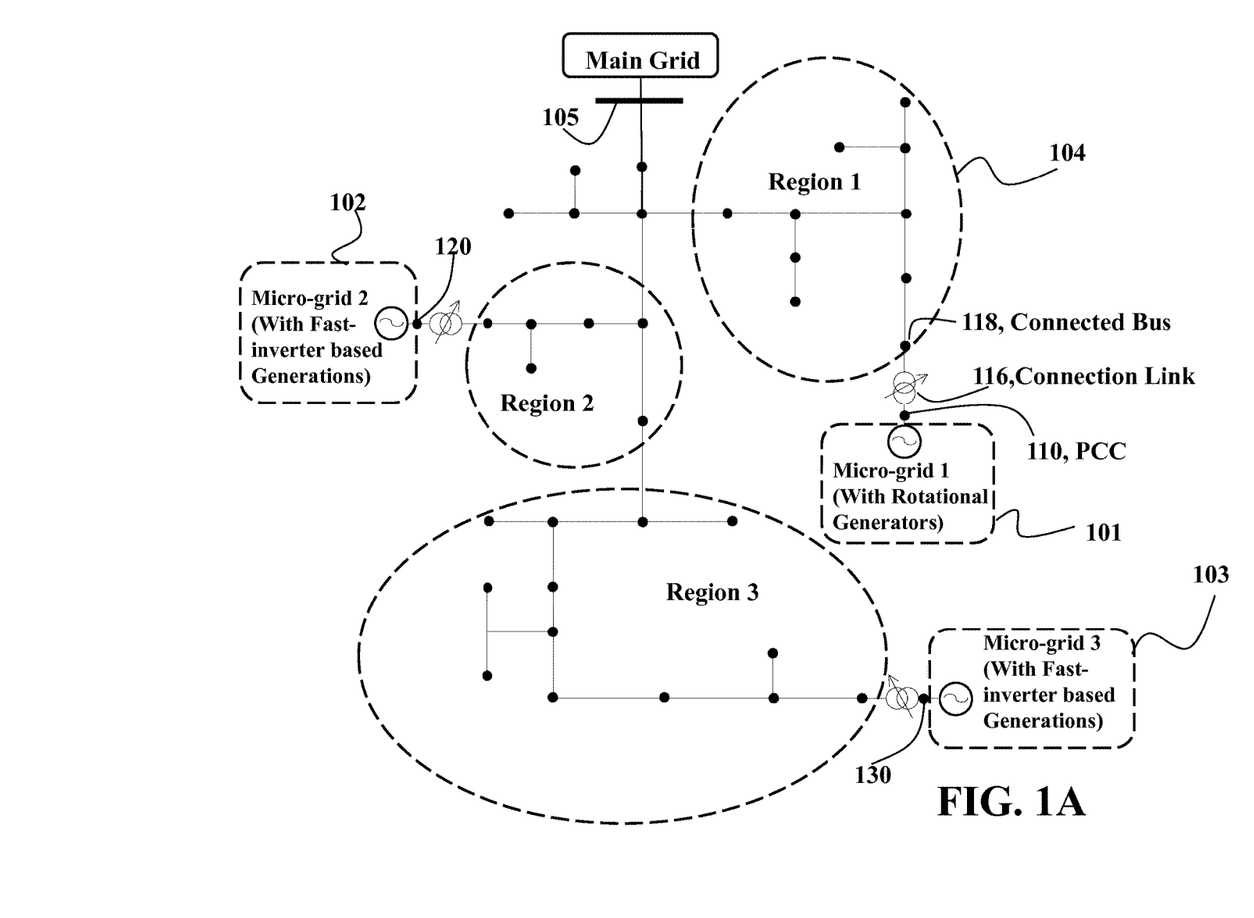
FIG. 1A is a schematic of a micro-grid connected to a power distribution system according to some embodiments of an invention.

FIG. 1A shows an example of a micro-grid, e.g., a micro-grid 101, 102 or 103, connected to a power distribution system (PDS) 104 according to some embodiments of an invention. The PDS is connected to the main grid (i.e. transmission system) through a bus 105. Three micro-grids are connected to the PDS through a point of common coupling (PCC), for example, buses 110, 120, and 130 respectively. Therefore, each micro-grid connects to the power distribution network through its PCC at bus i to a load bus j. A link connects the PCC of each micro-grid with a bus of the PDS. For example, the PCC 110 is connected with the first bus 118 on the PDS through a connection link. The connection link can include, for example, a step-up transformer 116 or transmission line to connect the micro-grid to the connected bus 118.

In some implementations, the taps of each transformer are used to regulate the voltage at a point of common coupling (PCC) of each micro-grid. Each tap change corresponds to a given amount, such as 1.25% of voltage magnitude variation, with a mechanical delay of several seconds. In some embodiments, the PCC voltage of each micro-grid is regulated by an automatic controller, such as a droop controller.

The phase angle at each PCC can also be regulated by a droop controller for a fast-inverter-based generator, whose dynamics are regulated by a swing equation for a rotational-machine-based generator. Depending on the generator installed at each micro-grid, the inertia of each micro-grid can be different. For example, Bus 110 is connected to micro-grid 1 that has rotational generators that have a large inertia. Bus 120 and Bus 130 are connected to micro-grids 2 and 3 that have fast-inverter based generations with small inertia values.

Similarly, reactive power-voltage droop controllers have different parameters that relate back to their reactive power capacity. As a result, voltage magnitude deviation is different for different micro-grids even while a same amount of reactive power is injected.

In the example of FIG. 1A, there are three regions in the power distribution network. In each region, a micro-grid is coupled to the end of distribution feeder through a transformer with tap changer. Some embodiments of the invention are based on a realization that such a voltage can be determined and/or regulated according to a model of dynamics of the micro-grid exponentially stable on a voltage set-point at the PCC. This is because voltage drops most at feeder's end, voltage-control ancillary service is most needed to regulate voltage at these micro-grid-connected buses.

Figure 1B:
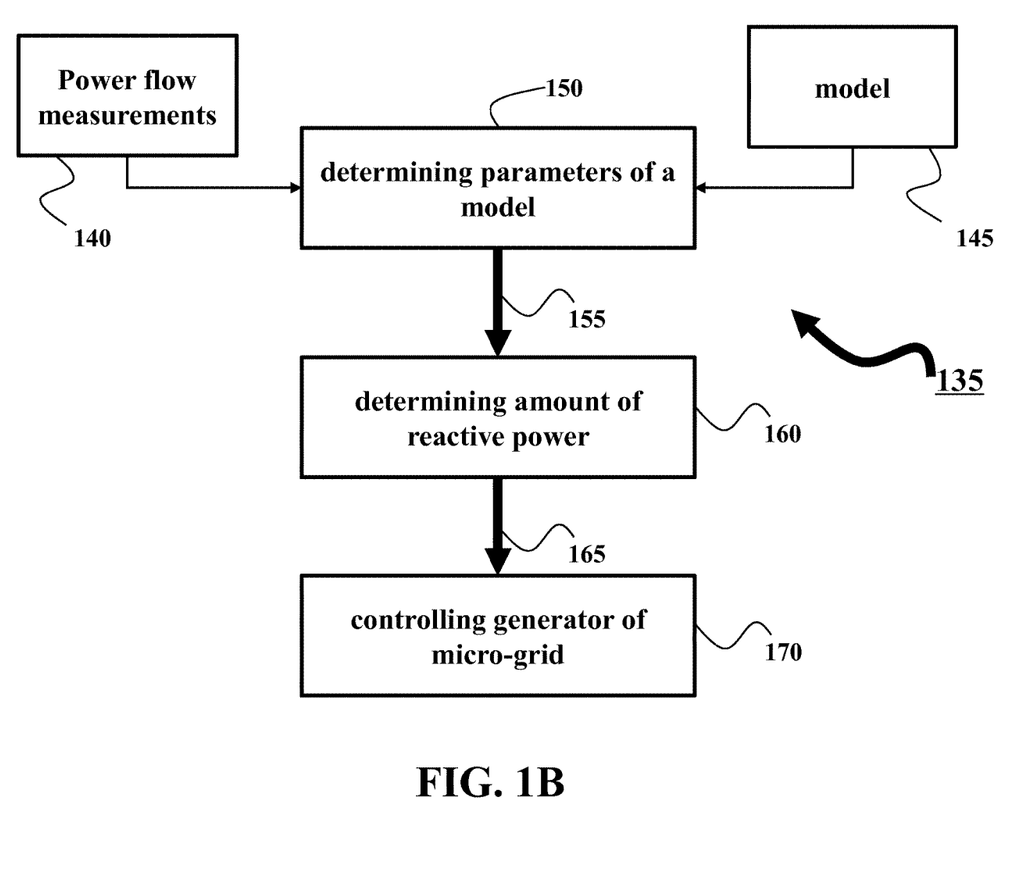
FIG. 1B is a block diagram of a method for controlling a micro-grid connected to a power distribution system according to some embodiments of the invention.

FIG. 1B shows a block diagram of a method for controlling a micro-grid connected to a power distribution system according to some embodiments of the invention. At least some steps of the method are performed using a processor 135. The method includes determining 150 parameters 155 of a model 145 of dynamics of the micro-grid using measurements 140 of power flow at a PCC of the micro-grid with the power distribution system. The model 145 used by various embodiments of the invention is exponentially stable on a voltage set-point at the PCC, and thus enables asymptotically stable control of the voltage at the PCC, which, in turn, enables ability to plug-and-play integration of the micro-grid into the PDS without additional control efforts from the PDS.

Therefore, the method further includes determining 160, using the parameters 155 of the model, an amount of reactive power 165 required to maintain the voltage at the PCC asymptotically stable on the voltage set-point. After the amount of reactive power is determined, the method controls 170 a generator of the micro-grid to produce the amount of reactive power.

Power Flow Relationship

Some embodiments of the invention determine the asymptotically stable model using a function of a reactive power injected into the PCC, a function of load variation in the micro-grid, and a function of voltage variation at the PCC. In such a manner, the parameters of such a model can be determined using measurement of the power flow on a link connecting the PCC with the PDS, which is local information available to the controller of the micro-grid.

Figure 2:
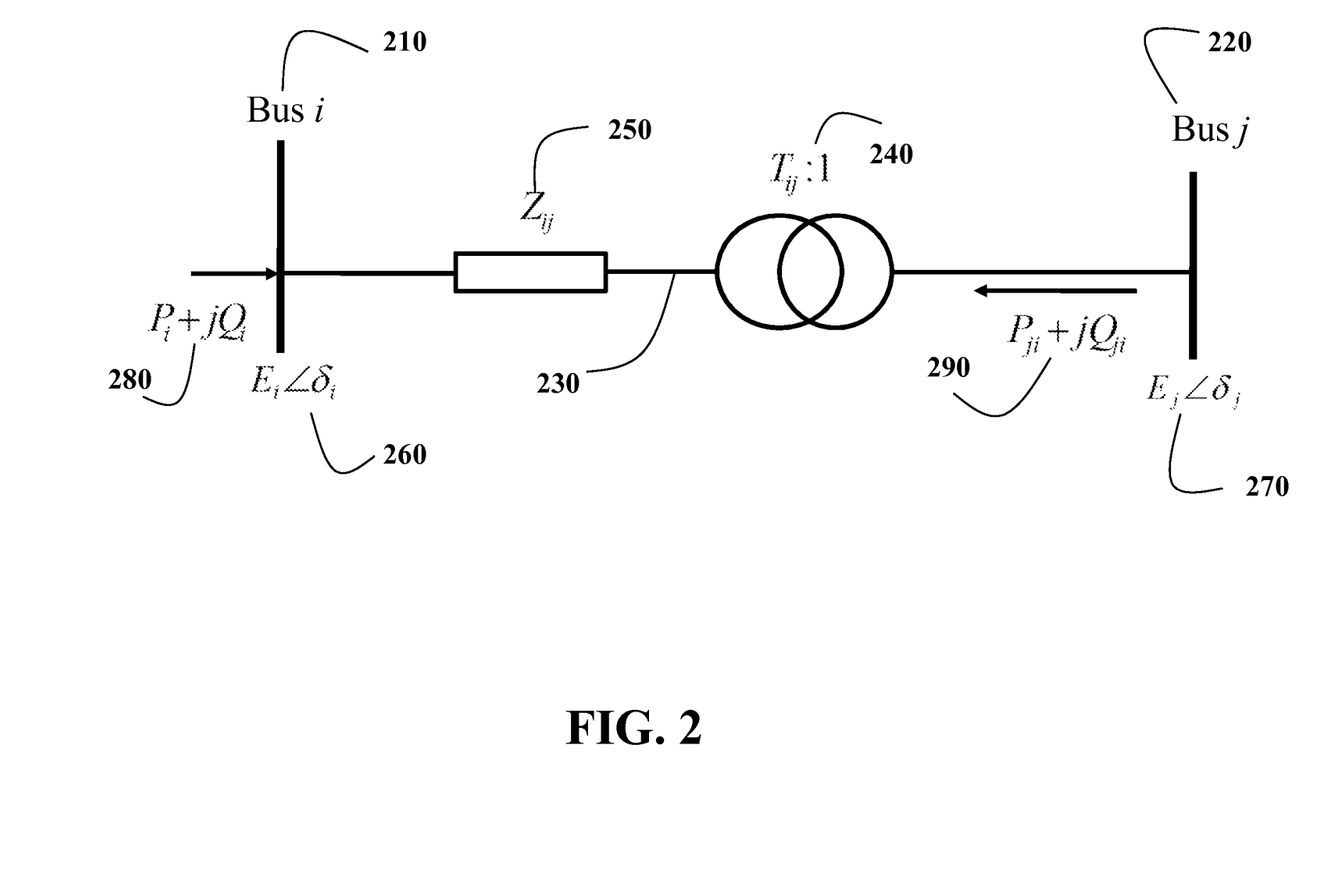
FIG. 2 is schematic of a general branch model for the connection link between the PCC of the micro-grid and the power distribution system.

FIG. 2 is a general branch model for the connection link between Bus i, 210 and Bus j, 220. The connection link, 230 is either a transmission line or a transformer with tap changer. A micro-grid usually connects to a step-up transformer, 240 that automatically regulates voltage at the PCC. Automatic voltage regulation is achieved by changing tap positions at the low-voltage (micro-grid) side of this step-up transformer with a tap value $T_{ij}$. For a transmission line, this tap value is always $T_{ij}=1$.

To model the power flow relationship between Bus i, 210 and Bus j, 220, only the connection link is considered. The impedance of this connection link is $Z_{ij}$, 250. With a little abuse of notation, symbol $Y_{ij}$ is defined as $$Y_{ij} = -\frac{1}{Z_{ij}}. \qquad (1)$$

The symbol $Y_{ij}$ is expressed in two forms:

$Y_{ij}=G_{ij}+jB_{ij}$, and $$Y_{ij}=|Y_{ij}|\angle\phi_{ij}, \qquad (2)$$

where $|Y_{ij}|=\sqrt{G_{ij}^2+B_{ij}^2}$ and $\phi_{ij}=\tan^{-1}(B_{ij}/G_{ij})$.

At Bus i, $E_i$ is voltage magnitude and $\delta_i$ is phase angle of the voltage, 260; $P_i$ and $Q_i$ are injected powers. At Bus j, $E_j$ is voltage magnitude and $\delta_j$ is phase angle of the voltage, 270. Using the expression of $Y_{ij}$, the real and reactive powers flowing into bus i, 280 are expressed as follows $$P_i = T_{ij} E_i E_j |Y_{ij}| \cos(\delta_i - \delta_j - \phi_{ij}) - E_i^2 |Y_{ij}| \cos(\phi_{ij}), \text{ and} \quad (3)$$

$$Q_i = E_i^2 |Y_{ij}| \sin(\phi_{ij}) + T_{ij} E_i E_j |Y_{ij}| \sin(\delta_i - \delta_j - \phi_{ij}). \quad (4)$$

The real and reactive powers flowing from Bus j to Bus i, 290 are $$P_{ji} = T_{ij} E_i E_j |Y_{ij}| \cos(\delta_i - \delta_j - \phi_{ij}) - T_{ij}^2 E_j^2 |Y_{ij}| \cos(\phi_{ij}), \text{ and} \quad (5)$$

$$Q_{ji} = T_{ij}^2 E_j^2 |Y_{ij}| \sin(\phi_{ij}) - T_{ij} E_i E_j |Y_{ij}| \sin(\delta_i - \delta_j - \phi_{ij}). \quad (6)$$

To define a single model for both generator bus and load bus, each bus connects a generator and a load. $P_{gen,i}$ and $Q_{gen,i}$ denote generated power; $P_{load,i}$ and $Q_{load,i}$ are real and reactive loads. Power flows at bus i, are then $$P_i = P_{gen,i} - P_{load,i}, \text{ and} \quad (7)$$

$$Q_i = Q_{gen,i} - Q_{load,i}. \quad (8)$$

Without power generation whatsoever, a load bus j has $P_j + P_{load,j} = 0$, and $Q_j + Q_{load,j} = 0$.

These parameters are initially determined during configuration and planning for the power distribution system. The parameters can vary subsequently due to control activities.

Load Model

A power distribution network or a micro-grid can include various types of loads that can be generally represented using a ZIP load model as a polynomial load model. The ZIP model combines constant-impedance (Z), constant-current (I) and constant-power (P) components. Real and reactive loads at any bus i, are defined as functions of voltage magnitude $E_i$ (in p.u.) as $$P_{load,i}(E_i) = E_i^2 P_{Z-load,i} + E_i P_{I-load,i} + P_{P-load,i}, \text{ and} \quad (9)$$

$$Q_{load,i}(E_i) = E_i^2 Q_{Z-load,i} + E_i Q_{I-load,i} + Q_{P-load,i}, \quad (10)$$

where $P_{Z-load,i}$ and $Q_{Z-load,i}$ are nominal constant impedance loads, including shunt devices, $P_{I-load,i}$ and $Q_{I-load,i}$ are nominal constant-current loads, denoting devices that are modeled as current sources; $P_{P-load,i}$ and $Q_{P-load,i}$ are nominal constant-power loads, generally as a result of power control mechanism. As a result, the ZIP model represents a variety of loads and control devices.

Under nominal conditions, real and reactive power load values are functions of $E_i$ $$P_{load,set,i}(E_i) = E_i^2 P_{Z-load,set,i} + E_i P_{I-load,set,i} + P_{P-load,set,i}, \quad (11)$$

$$Q_{load,set,i}(E_i) = E_i^2 Q_{Z-load,set,i} + E_i Q_{I-load,set,i} + Q_{P-load,set,i}. \quad (12)$$

Combining load expressions in equations (9-12), load changes $\Delta P_{load,i}(E_i)$ and $\Delta Q_{load,i}(E_i)$ are defined as $$\Delta P_{load,i}(E_i) = P_{load,i}(E_i) P_{load,set,i}(E_i) = E_i^2 \Delta P_{Z-load,i} + E_i \Delta P_{I-load,i} + \Delta P_{P-load,i}, \quad (13)$$

$$\Delta Q_{load,i}(E_i) = Q_{load,i}(E_i) - Q_{load,set,i}(E_i) = E_i^2 \Delta Q_{Z-load,i} + E_i \Delta Q_{I-load,i} + \Delta Q_{P-load,i}, \quad (14)$$

where $\Delta P_{Z-load,i}$ and $\Delta Q_{Z-load,i}$ are variations of constant-impedance load component; $\Delta P_{I-load,i}$ and $\Delta Q_{I-load,i}$ are variations of constant-current load component; $\Delta P_{P-load,i}$ and $\Delta Q_{P-load,i}$ are variations of constant-power load component.

Primary Droop Controllers

As small-scale power system, micro-grids are often managed by droop controllers. Droop controllers help a micro-grid to maintain power sharing when system states deviate from their nominal values.

A droop controller can be used to manage voltage magnitude at the PCC of the micro-grid with the following primary dynamics $$\frac{dE_i}{dt} = (E_{ref,i} - E_i) - m_{Q,i} Q_{gen,i}, \quad (15)$$

where $m_{Q,i}$ is a droop slope of the Q-E droop controller; $E_{ref,i}$ denotes voltage control command; $Q_{gen,i}$ is reactive power generation from the micro-grid. With such a droop controller, the amount of injected reactive power from a micro-grid, i.e., $Q_{gen,i}$, is proportional to the voltage difference between $E_{ref,i}$ and $E_i$. The varied reactive power injection prevents voltage magnitude $E_i$ from further changing.

Similar to voltage regulation, phase angle at a micro-grid's PCC with fast inverter is controlled through a droop controller, whose dynamics are as follows $$\frac{d\delta_i}{dt} = m_{P,i}(P_{ref,i} - P_{gen,i}) + \omega_0, \quad (16)$$

where $m_{P,i}$ is droop slope of the P-frequency droop controller; $P_{ref,i}$ denotes real power generation command; $\omega_0$ is the nominal angular frequency. With such a droop controller, the amount of injected real power from a micro-grid, i.e., $P_{gen,i}$, is proportional to the frequency deviation from the nominal $\omega_0$ at bus i. If the micro-grid is based on a rotational generator, then phase angle dynamics are usually depicted by a swing equation as $$M_i \frac{d^2 \delta_i}{dt^2} + D_i \frac{d\delta_i}{dt} = P_{ref,i} + D_i \omega_0 - P_{gen,i}, \quad (17)$$

where $M_i$ is the machine's inertia and $D_i$ is the damping ratio at bus i.

Additionally, the dynamics of a rotational generator is equivalent to a fast inverter (used at a micro-grid's PCC) with low-pass filters. As a result, the phase angle dynamics of both electronic and rotational generators can be expressed using the same swing equations, but parameters vary for different generators. A rotational generator has large inertia $M_i$ but small damping ratio $D_i$, while $M_i$ and $D_i$ a fast inverter are both small.

Determination of Parameters of the Connection Link

To form a distributed secondary voltage control input, parameters of the connection link between a micro-grid at bus i and pure load bus j are determined. If a transmission line is used, parameters are $|Y_{ij}|$ and $\phi_{ij}$; if the connection link is a transformer with tap changer, parameters include $|Y_{ij}|$, $\phi_{ij}$ and $T_{ij}$. The measurements available include real and reactive power injection at bus i, $P_i$ and $Q_i$, voltage magnitude at bus i, real and reactive power flow from bus j to bus i, $P_{ji}$ and $Q_{ji}$, and voltage magnitude at bus j, $E_j$.

For a transmission-line link, its parameters $|Y_{ij}|$ and $\phi_{ij}$ are determined as:

$$\phi_{ij} = \tan^{-1}\left(\frac{Q_{ji} + Q_i}{-P_{ji} - P_i}\right), \quad (18)$$

$$|Y_{ij}| = \frac{P_i^2 + Q_i^2}{E_i^2 (b_{Li} + c_{Li})}, \quad (19)$$

where $b_{Li}=Q_{ji}\sin(\phi_{ij})-P_{ji}\cos(\phi_{ij})$ and $c_{Li}=Q_i\sin(\phi_{ij})-P_i\cos(\phi_{ij})$.

For a transformer with tap changer that automatically regulates voltage magnitude, parameters $|Y_{ij}|$, $\phi_{ij}$ and $T_{ij}$ are determined as:

$$\phi_{ij} = \tan^{-1}\left(\frac{Q_{ji}+Q_i}{-P_{ji}-P_i}\right), \quad (20)$$

$$(\delta_i - \delta_j) = \tan^{-1}\left(\frac{a_{Ti}}{\frac{P_i^2+Q_i^2}{b_{Ti}+c_{Ti}} - c_{Ti}}\right), \quad (21)$$

$$|Y_{ij}| = \frac{c_{Ti} + \frac{a_{Ti}}{\tan(\delta_i-\delta_j)}}{E_i^2}, \text{ and} \quad (22)$$

$$T_i = \frac{a_{Ti}}{|Y_{ij}|E_iE_j\sin(\delta_i-\delta_j)}, \quad (23)$$

where $a_{Ti}=P_i\sin(\phi_{ij})+Q_i\cos(\phi_{ij})=-P_{ji}\sin(\phi_{ij})-Q_{ji}\cos(\phi_{ij})$, $b_{Ti}=Q_{ji}\sin(\phi_{ij})-P_{ji}\cos(\phi_{ij})$, and $c_{Ti}=Q_i\sin(\phi_{ij})-P_i\cos(\phi_{ij})$.

Reactive Power Function of Voltage Error

Based on the power flow relationship in equation (3) and (4), a set point is defined as $(E_{set}, \delta_{set}, P_{set}, Q_{set}, \omega_{set})$. Based on nominal parameters, a set point is usually determined by solving an optimal power flow (OPF) problem such that a cost function is minimized. As system parameters change during power network operation, actual system states deviate from this set point. With respect to a set point under nominal conditions, error states at bus i are defined as $\tilde{E}_i = E_i - E_{set,i}$ and $\tilde{Q}_i = Q_{set,i} - Q_i$.

Using the simplified expression in equation (4), the reactive power error $\tilde{Q}_i$ is defined as a function of voltage error $\tilde{E}_i$ as follows $$\tilde{Q}_i = Q_{set,i} - Q_i, \quad (24)$$

$$= E_{set,i}^2|Y_{ij}|\sin(\phi_{ij}) - E_i^2|Y_{ij}|\sin(\phi_{ij}) + T_{set,ij}E_{set,i}E_{set,j}|Y_{ij}|$$

$$\sin(\delta_{set,i}-\delta_{set,j}-\phi_{ij}) - T_{ij}E_iE_j|Y_{ij}|\sin(\delta_i-\delta_j-\phi_{ij})$$

$$= -(2E_{set,i}\tilde{E}_i + \tilde{E}_i^2)|Y_{ij}|\sin(\phi_{ij}) -$$

$$T_{ij}\tilde{E}_iE_j|Y_{ij}|\sin(\delta_i-\delta_j-\phi_{ij}) -$$

$$T_{ij}E_{set,i}E_j|Y_{ij}|\sin(\delta_i-\delta_j-\phi_{ij}) +$$

$$T_{set,ij}E_{set,i}E_{set,j}|Y_{ij}|\sin(\delta_{set,i}-\delta_{set,j}-\phi_{ij})$$

$$= -\tilde{E}_i^2|Y_{ij}|\sin(\phi_{ij}) - \tilde{E}_i\left[\begin{array}{c}2E_{set,i}|Y_{ij}|\sin(\phi_{ij}) + \\ T_{ij}E_j|Y_{ij}|\sin(\delta_i-\delta_j-\phi_{ij})\end{array}\right] +$$

$$T_{set,ij}E_{set,i}E_{set,j}|Y_{ij}|\sin(\delta_{set,i}-\delta_{set,j}-\phi_{ij}) -$$

$$T_{ij}E_{set,i}E_j|Y_{ij}|\sin(\delta_i-\delta_j-\phi_{ij})$$

where $T_{set,ij}$ is the nominal tap value used to determine the set point. Similarly, load variation with respect to nominal conditions is expressed as a function of $\tilde{E}_i$ as $$Q_{load,set,i}(E_{set,i}) - Q_{load,i}(E_i) = \quad (25)$$

$$E_{set,i}^2 Q_{Z-load,set,i} + E_{set,i}Q_{I-load,set,i} + Q_{P-load,set,i} -$$

$$(E_{set,i}+\tilde{E}_i)^2(\Delta Q_{Z-load,set,i} + \Delta Q_{Z-load,i}) -$$

$$(E_{set,i}+\tilde{E}_i)(Q_{I-load,set,i}+\Delta Q_{I-load,i}) - (Q_{P-load,set,i}+\Delta Q_{P-load,i}) =$$

$$-(2E_{set,i}\tilde{E}_i + \tilde{E}_i^2)Q_{Zload,set,i} - Q_{I-load,set,i}\tilde{E}_i -$$

$$(E_i^2\Delta Q_{Z-load,i} + E_i\Delta Q_{I-load,i} + \Delta Q_{P-load,i}) = -\tilde{E}_i^2 Q_{Z-load,set,i} -$$

$$\tilde{E}_i(2E_{set,i}Q_{Z-load,set,i} + Q_{I-load,set,i}) - \Delta Q_{load,i}(E_i)$$

Secondary Voltage Controller

The distributed secondary voltage controller only uses local measurement to form a control input to a primary droop controller. A constant voltage is maintained at the micro-grid's PCC, because this control input cancels the impact of changes in the power distribution network, such as load variations.

The required local measurement is available at a micro-grid's PCC. The set of measurements includes: the voltages at the micro-grid's PCC and the connected bus, the power injections from the micro-grid's PCC, and the powers flowing from the connection bus towards the micro-grid's PCC. These measurements are states at both sides of the step-up transformer of a micro-grid. Other than these local measurements, there is no global communication required for the power distribution network.

Using the distributed secondary voltage controller, a distribution system operator only regularly designates a control command based on a set point. Between any two consecutive control command updates, the micro-grid's PCC maintains voltage at the set point. Moreover, because the secondary voltage controller only uses local measurements, it enables a micro-grid to have plug-and-play capability.

Figure 3:
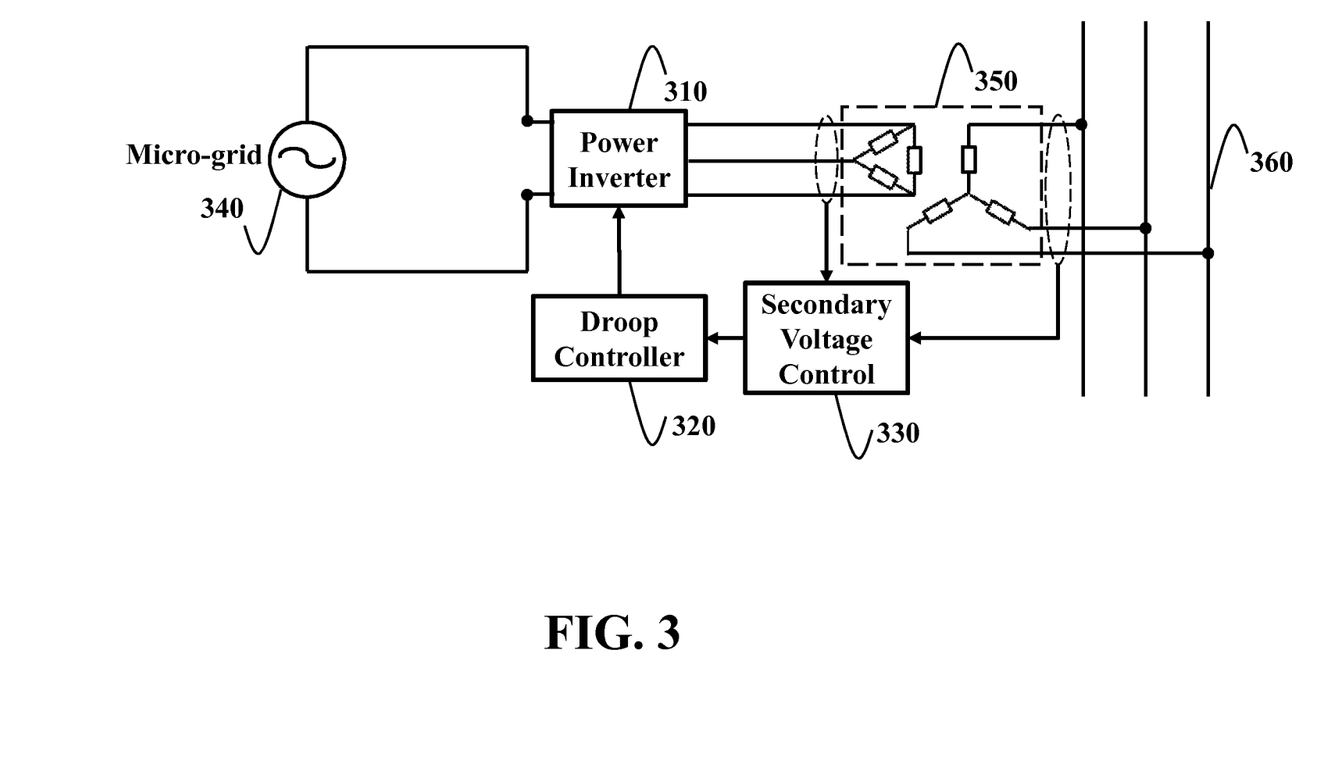
FIG. 3 is a schematic of a three-phase primary droop controller according to some embodiments of the invention.

FIG. 3 is a schematic of a three-phase primary droop controller 320 with distributed secondary voltage control 330. The primary droop controller with secondary voltage control is used to control a power inverter, 310 that controls a micro-grid, 340 to connect to the power distribution network, 360. The secondary voltage controller, 330 derives a voltage control input based on measurements from both sides of a step-up transformer, 350.

Based on conventional reactive power-voltage droop controller in equation (15), the distributed secondary voltage controller adds a control input $u_i$ to the dynamic equation as follows $$\frac{dE_i}{dt} = (E_{ref,i} - E_i) - m_{Q,i}Q_{gen,i} + m_{Q,i}u_i, \quad (26)$$

where the secondary voltage control input is $$u_i = (Q_i - Q_{set,i}) - (E_i^2 - E_{set,i}^2)B_{ij} + \Delta Q_{load,i}(E_i). \quad (27)$$

Similar to equations of reactive power error and load variation, this voltage control input is rewritten in a second-order polynomial as $$u_i = (Q_i - Q_{set,i}) - (E_i^2 - E_{set,i}^2)B_{ij} + \Delta Q_{load,i}(E_i) \quad (28)$$

$$= (Q_i - E_i^2 B_{ij}) - (Q_{set,i} - E_{set,i}^2 B_{ij}) + \Delta Q_{load,i}(E_i)$$

$$= T_{ij}E_iE_j|Y_{ij}|\sin(\delta_i-\delta_j-\phi_{ij}) -$$

$$T_{set,ij}E_{set,i}E_{set,j}|Y_{ij}|\sin(\delta_{set,i}-\delta_{set,j}-\phi_{ij}) + \Delta Q_{load,i}(E_i)$$

-continued $$\begin{aligned}
&= T_{ij}\tilde{E}_i E_j |Y_{ij}|\sin(\delta_i - \delta_j - \phi_{ij}) + \\
&\quad T_{ij}E_{set,i}E_j|Y_{ij}|\sin(\delta_i - \delta_j - \phi_{ij}) - \\
&\quad T_{set,ij}E_{set,i}E_{set,j}|Y_{ij}|\sin(\delta_{set,i} - \delta_{set,j} - \phi_{ij}) + \Delta Q_{load,i}(E_i) \\
&= -u_{a,i}\tilde{E}_i^2 - u_{b,i}\tilde{E}_i - u_{c,i}
\end{aligned}$$

where coefficients of the second-order polynomial are $u_{a,i} = 0$ $u_{b,i} = -T_{ij}E_j|Y_{ij}|\sin(\delta_i - \delta_j - \phi_{ij})$ $u_{c,i} = T_{set,ij}E_{set,i}E_{set,j}|Y_{ij}|\sin(\delta_{set,i} - \delta_{set,j} - \phi_{ij}) - T_{ij}E_{set,i}E_j|Y_{ij}|\sin(\delta_i - \delta_j - \phi_{ij}) - \Delta Q_{load,i}(E_i)$ The secondary voltage control input $u_i$ is only a function of local states so that no global communication is required. Parameters such as $|Y_{ij}|$, $\phi_{ij}$ and $T_{ij}$ are determined in real-time based on local measurements available at bus i.

Putting together reactive power expressions of voltage error, voltage error dynamics are obtained as $$\begin{aligned}
\frac{d\tilde{E}_i}{dt} &= \frac{dE_i}{dt} - \frac{dE_{set,i}}{dt} \\
&= \frac{dE_i}{dt} \\
&= (E_{set,i} - E_i) + m_{Q,i}(Q_{set,i} - Q_i) + \\
&\quad m_{Q,i}(Q_{load,i}(E_{set,i}) - Q_{load,i}(E)) + m_{Q,i}u_i \\
&= -\tilde{E}_i + m_{Q,i}\tilde{Q}_i + m_{Q,i}u_i + m_{Q,i}(Q_{load,set,i}(E_{set,i}) - Q_{load,i}(E_i)) \\
&= -m_{Q,i}a_i\tilde{E}_i^2 - m_{Q,i}b_i\tilde{E}_i
\end{aligned} \quad (29)$$

where coefficients are $a_i = Q_{Z\text{-}load,set,i} + B_{ij}$ $b_i = \frac{1}{m_{Q,i}} + Q_{l\text{-}load,set,i} + 2E_{set,i}(Q_{Z\text{-}load,set,i} + B_{ij})$ Distribution system operators only update voltage control commands $E_{ref,i}$ when there is a significant change to the power system. Between any two updates, the secondary voltage controller is able to maintain a constant voltage at the micro-grid's PCC regardless of changes happened in the rest of power system.

Figure 4:
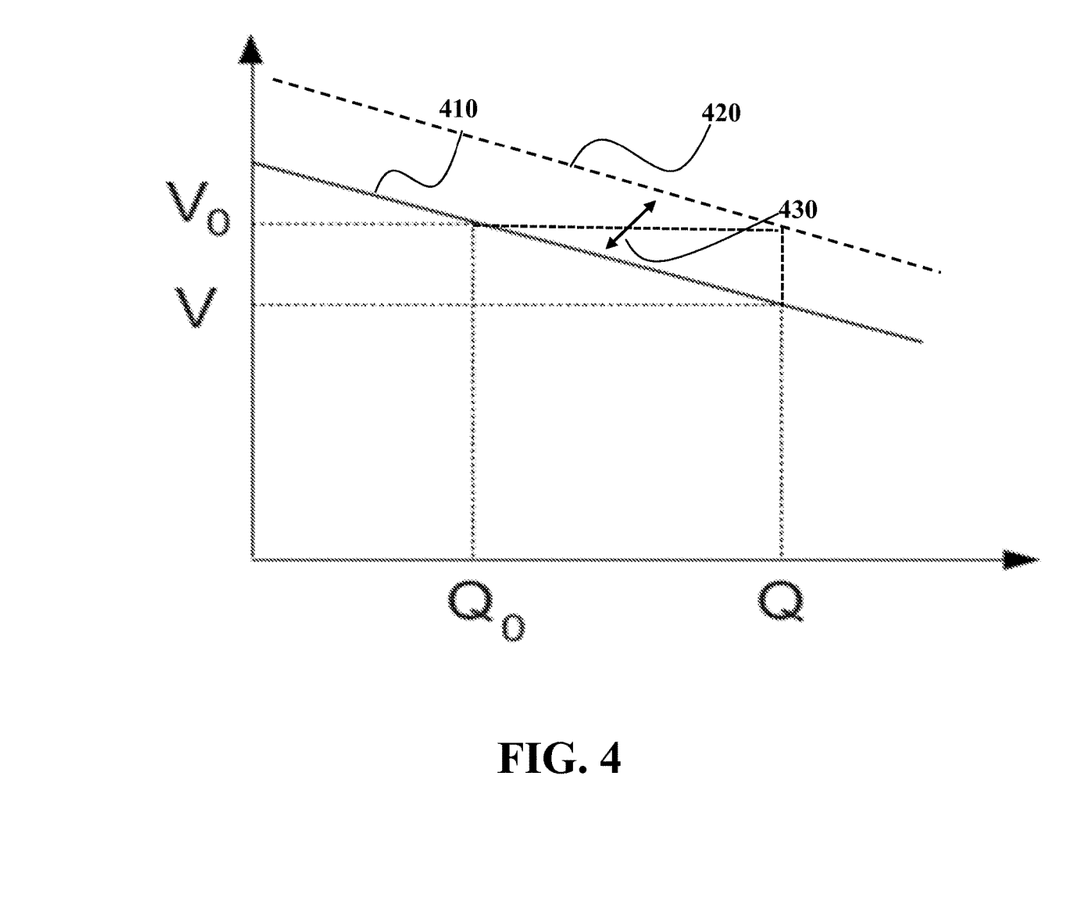
FIG. 4 is a schematic illustrating reactive-power control of the micro-grid using a droop controller according to some embodiments of the invention.

FIG. 4 shows a schematic illustrating reactive-power control of the micro-grid using a droop controller for controlling the generator using a primary control component of the model and a secondary voltage controller for controlling the generator using a stabilization component of the model. The droop controller controls the generator according to dynamics of the primary control using a droop slope 410 ensuring proportionality between the voltage at the PCC and the amount of the reactive power produced by the generator. Such a control is advantageous for automatic generation control (AGC) adjusting the power output of one or multiple generators at the micro-grid. However, such a control is unstable and can result in variable voltage generation. Accordingly, secondary voltage controller shifts 430 the droop slope 410 of the droop controller according to the stabilization component resulting in new shifted droop slope 420.

Asymptotic Stability of Secondary Voltage Controller

For a micro-grid at bus i and its connected load bus j, define $a_i = Q_{Z\text{-}load,set,i} + B_{ij}$ and $$b_i = \frac{1}{m_{Q,i}} + Q_{l\text{-}load,set,i} + 2E_{set,i}(Q_{Z\text{-}load,set,i} + B_{ij})$$

at a set point, if $b_i > 0$, there exists a secondary voltage control input $u_i = (Q_i - Q_{set,i}) - (E_i^2 - E_{set,i}^2)B_{ij} + \Delta Q_{load,i}(E_i)$, such that voltage at bus $E_i$, i.e. $E_i$, always converges to set point $E_{set,i}$ with a region of attraction defined as $$\begin{cases} E_i > -\dfrac{\frac{1}{m_{Q,i}} + Q_{l\text{-}load,set,i}}{a_i} - E_{set,i}, & \text{if } a_i > 0, \\ E_i < -\dfrac{\frac{1}{m_{Q,i}} + Q_{l\text{-}load,set,i}}{a_i} - E_{set,i}, & \text{if } a_i < 0. \end{cases} \quad (30)$$

The equilibrium point is $\tilde{E}_i = 0$, i.e. $E_i = E_{set,i}$. With respect to this equilibrium point, a candidate local Lyapunov function is defined as $$V_i = \frac{1}{2m_{Q,i}}\tilde{E}_i^2$$

whose derivative is $$\frac{dV_i}{dt} = \tilde{E}_i(-a_i\tilde{E}_i^2 - b_i\tilde{E}_i) = -(a_i\tilde{E}_i + b_i)\tilde{E}_i^2. \quad (31)$$

Regardless of the rest of power system, as long as $a_i\tilde{E}_i + b_i > 0$ at bus i, voltage magnitude $E_i$ asymptotically converges to the set point $E_{set,i}$. When $a_i > 0$, there is $$\tilde{E}_i > -\frac{b_i}{a_i};$$

when $a_i < 0$, there is $$\tilde{E}_i < -\frac{b_i}{a_i}.$$

A region of attraction is then defined by a maximum voltage error $$\begin{cases} \tilde{E}_i > -\dfrac{\frac{1}{m_{Q,i}} + Q_{l\text{-}load,set,i}}{a_i} - 2E_{set,i}, & \text{if } a_i > 0, \\ \tilde{E}_i < -\dfrac{\frac{1}{m_{Q,i}} + Q_{l\text{-}load,set,i}}{a_i} - 2E_{set,i}, & \text{if } a_i < 0. \end{cases} \quad (32)$$

Using equation $\tilde{E}_i = E_i - E_{set,i}$, the region of attraction of voltage magnitude is the same as shown above.

Exponential Stability of Secondary Voltage Controller

Besides asymptotic stability, the secondary voltage controller leads to exponential stability with respect to the set point $E_{set,i}$ with a lower bound of converging speed. The exponential stability result of voltage $E_i$ at bus i is as follows.

At bus i, the set point $E_i=E_{set,i}$ or $\tilde{E}_i=0$ is an isolated equilibrium point. When $a_i>0$, the range of voltage stability is $$\tilde{E}_i \in \left(-\frac{b_i}{a_i}, +\infty\right);$$

when $a_i<0$, the range of voltage stability is $$\tilde{E}_i \in \left(-\infty, -\frac{b_i}{a_i}\right).$$

Over an even smaller range, converging speed of voltage error $\tilde{E}_i$ is further bounded by a first-order dynamic system. When $a_i>0$, the inequality of voltage error derivative and range of voltage error is $$\dot{\tilde{E}}_i \geq -\frac{b_i}{2}m_{Q,i}\tilde{E}_i \geq 0 \text{ when } \tilde{E}_i \in \left[-\frac{b_i}{2a_i}, +\infty\right). \quad (33)$$

Similarly, when $a_i<0$, the voltage error derivative's inequality and voltage error range is $$\dot{\tilde{E}}_i \leq -\frac{b_i}{2}m_{Q,i}\tilde{E}_i \leq 0 \text{ when } \tilde{E}_i \in \left(-\infty, -\frac{b_i}{2a_i}\right]. \quad (34)$$

A special case is when $a_i=0$, where the voltage error range is $(-\infty, +\infty)$ and the dynamic equation is simply $\dot{\tilde{E}}_i = b_i m_{Q,i} \tilde{E}_i$. Obviously, converging speed in this situation is always faster than $$\dot{\tilde{E}}_i = -\frac{b_i}{2}m_{Q,i}\tilde{E}_i.$$

Combining all voltage error ranges above leads to $$\tilde{E}_i \in \left[-\frac{b_i}{2|a_i|}, \frac{b_i}{2|a_i|}\right] \text{ where} \quad (35)$$

$$\frac{b_i}{2|a_i|} = E_{set,i} + \frac{1/m_{Q,i} + Q_{I\text{-}load,set,i}}{2|a_i|}.$$

As a result, the range of voltage magnitude $E_i$ is $$E_i \in \left[-\frac{\frac{1}{m_{Q,i}} + Q_{I\text{-}load,set,i}}{2|a_i|}, 2E_{set,i} + \frac{\frac{1}{m_{Q,i}} + Q_{I\text{-}load,set,i}}{2|a_i|}\right]. \quad (36)$$

Within this voltage range, the local Lyapunov function $$V_i = \frac{1}{2m_{Q,i}}\tilde{E}_i^2$$

can be bounded from above and below as $$k_1 \tilde{E}_i^2 \leq V_i \leq k_2 \tilde{E}_i^2, \quad (37)$$

where $$k_1 = \frac{1}{2m_{Q,i}} \text{ and } k_2 = \frac{1}{2m_{Q,i}}.$$

Taking derivative of $V_i$ with respect to time leads to $$\frac{dV_i}{dt} = \frac{\partial V}{\partial \tilde{E}_i}\dot{\tilde{E}}_i = (a_i\tilde{E}_i + b_i)\tilde{E}_i^2 \leq -\frac{b_i}{2}m_{Q,i}\tilde{E}_i^2 = -k_3\tilde{E}_i^2, \quad (38)$$

where $$k_3 = \frac{b_i}{2}m_{Q,i}.$$

Based on exponential stability theorems, the equilibrium point $E_i=E_{set,i}$ is exponentially stable over the domain $$E_i \in \left[-\frac{\frac{1}{m_{Q,i}} + Q_{I\text{-}load,set,i}}{2|a_i|}, 2E_{set,i} + \frac{\frac{1}{m_{Q,i}} + Q_{I\text{-}load,set,i}}{2|a_i|}\right].$$

Input-Output Stability of Secondary Voltage Controller

The secondary voltage controller cancels impact of local load variations using the element $\Delta Q_{load,i}(E_i)$ in control input $u_i$. However, this element is a function of local measurement and the nominal load values. If measurements come with any form of disturbance, such as measurement noise, there will be an error in voltage magnitude at the micro-grid's PCC. Small-signal input-output stability result is demonstrated for this voltage controller.

Using the secondary voltage controller satisfying conditions of asymptotic and exponential stability, voltage error dynamics are as follows $$\dot{\tilde{E}}_i = -m_{Q,i}(a_i\tilde{E}_i + b_i)\tilde{E}_i - m_{Q,i}w_i. \quad (39)$$

According to exponential stability results, the system without disturbance $w_i$ is exponentially stable with respect to $\tilde{E}_i=0$. Adding the disturbance term leads to $$|m_{Q,i}w_i| \leq m_{Q,i}|w_i|, \text{ and}$$

$$|\tilde{E}_i| \leq 1 \cdot |\tilde{E}_i| + 0 \cdot |w_i|.$$

If $$|\tilde{E}_i| < \frac{b_i}{2|a_i|}$$

and $|w_i|<r_w$, according to input-output stability theorems, for each $\tilde{E}_i(t_0)$ with $$|\tilde{E}_i(t_0)| < \frac{b_i}{2|a_i|},$$

the system with disturbance $w_i$ is small-signal finite-gain $L_p$ stable for each $p \in [1, \infty]$. For each $w_i \in L_{pe}$ with $$\sup_{0 \le t \le \tau} |w_i(t)| \le \min\left\{r_w, \frac{b_i^2 m_{Q,i}}{4|a_i|}\right\} \text{ for all } \tau \in [0, +\infty), \quad (40)$$

the voltage error $\tilde{E}_i(t)$ satisfies $$\|\tilde{E}_{i,\tau}\| \le \gamma \|w_{i,\tau}\|_{L_p} + \beta, \quad (41)$$

where $$\gamma = \frac{2}{b_i m_{Q,i}},$$

$$\beta = \|E_i(t_0)\| \rho, \text{ and}$$

$$\rho = \begin{cases} 1 & \text{if } p = \infty, \\ \left(\frac{2}{b_i m_{Q,i}^2 p}\right)^{1/p} & \text{if } p \in [1, \infty). \end{cases}$$

As a result of input-output stability, performance of the distributed secondary voltage controller is satisfactory to provide ancillary services by maintaining high power quality in a power distribution network.

Figure 5:
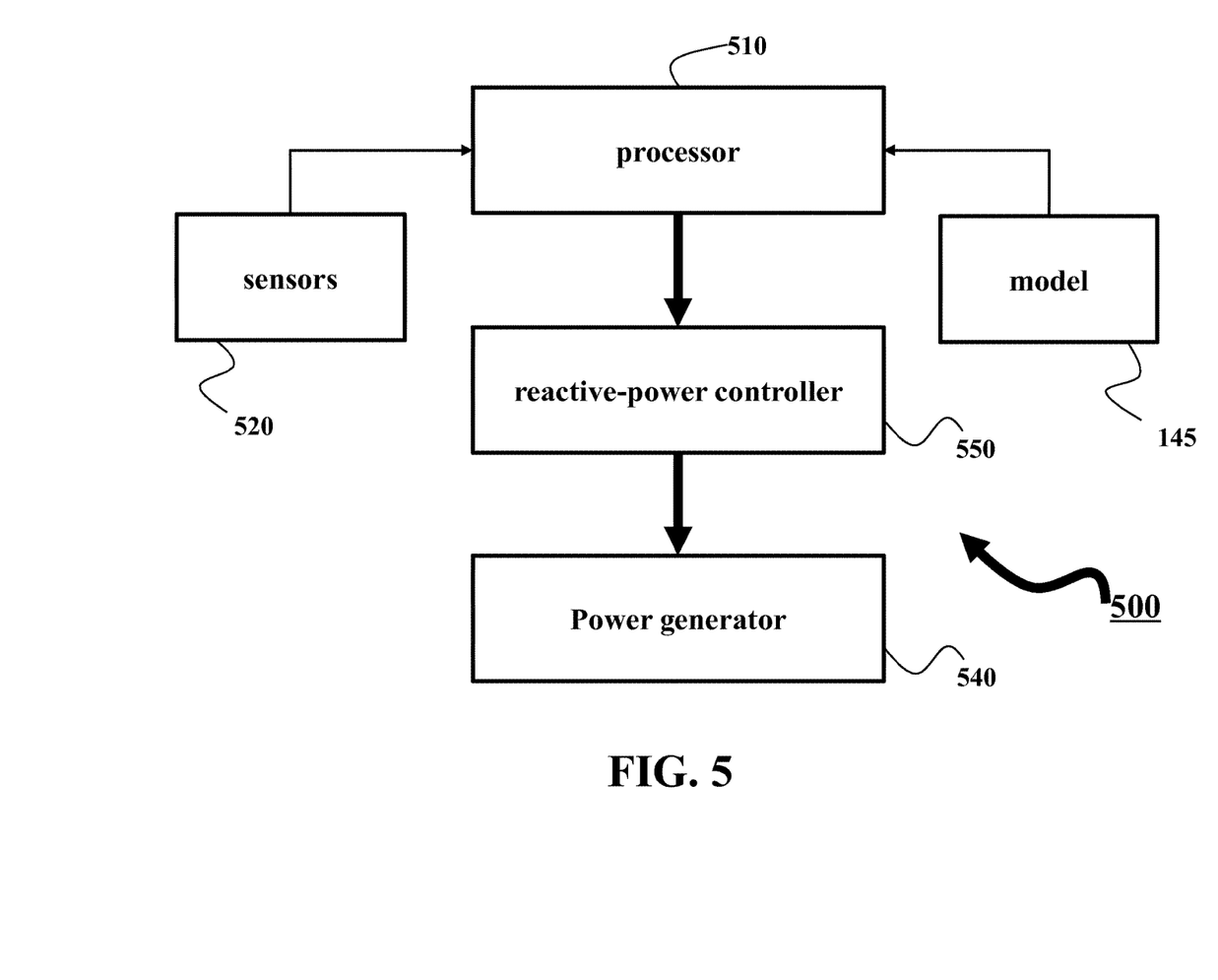
FIG. 5 is a block diagram of a system for controlling the voltage of a micro-grid connected to a power distribution system according to some embodiments of the invention.

FIG. 5 shows a block diagram of a system 500 for controlling the voltage of a micro-grid connected to a power distribution system. The system 500 includes a generator 540 producing a requested amount of reactive power. Examples of the generator include power generators using renewable energy such as sunlight, wind, rain, tides, waves, and geothermal heat. The system also includes a reactive-power controller 550 controlling the generator to produce the amount of reactive power.

The system 500 includes a processor 510 determining an amount of reactive power using a model 145 of dynamics of the micro-grid exponentially stable on a voltage setpoint at a point of common coupling (PCC) of the micro-grid and the power distribution network. The model includes a function of a reactive power injected into the PCC, a function of load variation in the micro-grid, and a function of voltage variation at the PCC. The set of sensors 520 is used for measuring state of power flow on a link connecting the PCC with a bus of the power distribution system to determine parameters of the model.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, and data structures that perform particular tasks or implement particular abstract data types. Typically the functionality of the program modules may be combined or distributed as desired in various embodiments. A processor for performing a function, performing a function or configured to perform a function can be implemented using circuitry in any suitable format that is programmed or otherwise configured to perform the function without additional modifications.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for controlling a micro-grid connected to a power distribution system, comprising:

determining parameters of a model of dynamics of the micro-grid using measurements of power flow at a point of common coupling (PCC) of the micro-grid with the power distribution system, wherein the model is stable on a voltage set-point at the PCC;

determining, using the parameters of the model, an amount of reactive power required to maintain the voltage at the PCC asymptotically stable on the voltage set-point; and controlling, via a reactive-power controller, a generator of the micro-grid to produce the amount of reactive power, wherein the reactive-power controller includes a droop controller for controlling the generator using a primary control component of the model, and includes a secondary voltage controller for controlling the generator using a stabilization component of the model, wherein the droop controller controls the generator according to dynamics of the primary control using a droop slope ensuring proportionality between the voltage at the PCC and the amount of the reactive power produced by the generator, and wherein a secondary voltage controller shifts the droop slope of the droop controller according to the stabilization component, wherein at least some steps of the method are performed using a processor.

2. The method of claim 1, wherein the model includes a function of a reactive power injected into the PCC, a function of a load variation in the micro-grid, and a function of a voltage variation at the PCC.

3. The method of claim 2, wherein the model that includes dynamics of a primary control component and a stabilization component, and the model further comprises:
   determining the primary control component using a function proportional to the voltage variation at the PCC;
   determining the stabilization component using a deviation of the reactive power injected into PCC from a reactive power set-point, a deviation of the voltage at the PCC from the voltage set-point, and the load variation in the micro-grid; and
   determining the amount of reactive power using a combination the primary control component and the stabilization component.

4. The method of claim 3, further comprising:
   measuring states of power flow at the PCC and a bus of the power distribution system connected to the micro-grid through a connection link to produce the measurements of the power flow, wherein the states of power flow include real and reactive power injections at the PCC, voltage magnitudes at the PCC, real and reactive power flows from the connected bus to the PCC, and voltage magnitudes at the connected bus;
   determining parameters of the connection link using the measurements of the power flow;
   determining the reactive power injection, the voltage deviations and the load variations in the micro-grid using the measurements of the power flow and the parameters of the connection link; and
   determining the stabilization component canceling impact of the load variation in the micro-grid.

5. The method of claim 4, wherein the parameters of the connection link includes the magnitude and phase angle of equivalent admittance, and transformer ratio.

6. The method of claim 3, wherein the model includes $$\frac{dE_i}{dt} = (E_{ref,i} - E_i) - m_{Q,i} Q_{gen,i} + m_{Q,i} u_i,$$

wherein $m_{Q,i}$ is a coefficient defining a droop slope of the droop controller, $E_{ref,i}$ is the voltage reference at PCC that determined based on the voltage set point $E_{set,i}$ and reactive power set point $Q_{set,i}$ as $$E_{ref,i} = E_{set,i} + m_{Q,i}[Q_{set,i} + Q_{load,set,i}(E_{set,i})],$$

$Q_{load,set,i}(E_{set,i})$ is the reactive power of load demand at PCC under the set point voltage, $E_i$ is the voltage at the PCC, $Q_{gen,i}$ is the amount of the reactive power produced by the generator, such that amount of the reactive power $Q_{gen,i}$ is proportional to the deviation of the voltage at the PCC from the voltage set point, wherein $u_i$ is the stabilization component determined to make time t derivative of the voltage at the PCC on zero value.

7. The method of claim 6, wherein the stabilization component $u_i$ is a secondary voltage control input to the droop controller determined using $$u_i = (Q_i - Q_{set,i}) - (E_i^2 - E_{set,i}^2) B_{ij} + \Delta Q_{load,i}(E_i),$$

wherein $$\Delta Q_{load,i}(E_i) = E_i^2 \Delta Q_{Z-load,i} + E_i \Delta Q_{I-load,i} + \Delta Q_{P-load,i}$$

wherein $\Delta Q_{Z-load,i}$ is a variation of constant-impedance load component, $\Delta Q_{I-load,i}$ is a variation of constant-current load component, $\Delta Q_{P-load,i}$ is a variation of constant-power load component, $B_{ij}$ is the imaginary component of equivalent admittance determined as negative of inverse of impedance of the connection link between the PCC and the first bus of distribution system, $z_{ij}$.

8. The method of claim 6, wherein the stabilization component determined to lead to stability with converging speed faster than $$\frac{dE_i}{dt} = -\frac{1}{2} m_{Q,i} b_i (E_i - E_{set,i})$$

in a region of values of the voltage at the PCC $$E_i \in \left[ -\frac{\frac{1}{m_{Q,i}} + Q_{I-load,set,i}}{2|a_i|}, 2E_{set,i} + \frac{\frac{1}{m_{Q,i}} + Q_{I-load,set,i}}{2|a_i|} \right],$$

wherein, $$a_i = Q_{Z-load,set,i} + B_{ij},$$

$$b_i = \frac{1}{m_{Q,i}} + Q_{I-load,set,i} + 2E_{set,i}(Q_{Z-load,set,i} + B_{ij}),$$

$Q_{Z-load,set,i}$ is reactive power of nominal constant-impedance load component, $\Delta Q_{I-load,i}$ is reactive power of nominal constant-current load component.

9. The method of claim 1, wherein the model with disturbance is small-signal finite-gain $L_p$ stable for each $p \in [1, \infty)$.

10. The method of claim 1, wherein the generator includes one or combination of small-size synchronous generators, solar panels, a wind turbine, and energy storages.

11. A system for controlling the voltage of a micro-grid connected to a power distribution system, comprising:
   a generator producing a requested amount of reactive power;
   a processor determining an amount of reactive power using a model of dynamics of the micro-grid that is stable on a voltage setpoint at a point of common coupling (PCC) of the micro-grid and the power distribution network, wherein the model includes a function of a reactive power injected into the PCC, a function of load variation in the micro-grid, and a function of voltage variation at the PCC;
   a set of sensors for measuring state of power flow on a link connecting the PCC with a bus of the power distribution system to determine parameters of the model; and
   a reactive-power controller controlling the generator to produce the amount of reactive power, wherein the reactive-power controller includes a droop controller for controlling the generator using a primary control component of the model, and includes a secondary voltage controller for controlling the generator using a stabilization component of the model, wherein the droop controller controls the generator according to dynamics of the primary control using a droop slope ensuring proportionality between the voltage at the PCC and the amount of the reactive power produced by the generator, and wherein a secondary voltage controller shifts the droop slope of the droop controller according to the stabilization component.

12. A method for controlling a micro-grid connected to a power distribution system, comprising:
   determining parameters of a model of dynamics of the micro-grid using measurements of power flow at a point of common coupling (PCC) of the micro-grid with the power distribution system, wherein the model is stable on a voltage set-point at the PCC, wherein the model is Lyapunov stable with respect to the set point, and associated Lyapunov function is defined as $$\frac{1}{2m_{Q,i}}(E_i - E_{set,i})^2,$$

and the equilibrium point of the model is $E_i = E_{set,i}$;
   determining, using the parameters of the model, an amount of reactive power required to maintain the voltage at the PCC asymptotically stable on the voltage set-point; and
   controlling a generator of the micro-grid to produce the amount of reactive power, wherein at least some steps of the method are performed using a processor.

* * * * *